United States Patent
Hondroulis et al.

(10) Patent No.: US 10,639,612 B2
(45) Date of Patent: May 5, 2020

(54) PROCESS FOR CONVERTING BANANA TREE STALK INTO FIBERS FOR ABSORPTION OF HYDROCARBONS AND CORRESPONDING SYSTEM AND PRODUCT

(71) Applicant: GEOPHIA LLC, Atlanta, GA (US)

(72) Inventors: Dimitrios Hondroulis, Atlanta, GA (US); Jean-Claude Vacher, Davie, FL (US)

(73) Assignee: GEOPHIA LLC, Atlanta, GA (US)

( * ) Notice: Subject to any disclaimer, the term of this patent is extended or adjusted under 35 U.S.C. 154(b) by 0 days.

(21) Appl. No.: 16/407,484

(22) Filed: May 9, 2019

(65) Prior Publication Data
US 2019/0308167 A1 Oct. 10, 2019

Related U.S. Application Data

(62) Division of application No. 13/947,701, filed on Jul. 22, 2013, now Pat. No. 10,293,327.

(51) Int. Cl.
*B01J 20/00* (2006.01)
*B01J 20/24* (2006.01)
*B01J 20/28* (2006.01)
*B01J 20/30* (2006.01)

(52) U.S. Cl.
CPC ......... *B01J 20/24* (2013.01); *B01J 20/28023* (2013.01); *B01J 20/3035* (2013.01); *B01J 20/3078* (2013.01); *B01J 2220/485* (2013.01)

(58) Field of Classification Search
CPC ................................ B01J 20/24; B01J 20/00
USPC .......................................... 435/177; 502/404
See application file for complete search history.

(56) References Cited

U.S. PATENT DOCUMENTS

| | | |
|---|---|---|
| 5,851,672 A | 12/1998 | Wang et al. |
| 5,958,182 A | 9/1999 | Hondroulis et al. |
| 6,027,652 A | 2/2000 | Hondroulis et al. |
| 6,506,307 B1 | 1/2003 | Hondroulis et al. |
| 6,599,547 B1 | 7/2003 | Martinez-Serna Villagran et al. |
| 6,858,261 B1 | 2/2005 | Bär et al. |
| 2012/0097351 A1 | 4/2012 | Scharpf et al. |

OTHER PUBLICATIONS

Nov. 7, 2014 Search Report and Written Opinion issued in International Patent Application No. PCT/US2014/046815; 8 pp.

*Primary Examiner* — Haytham Soliman
(74) *Attorney, Agent, or Firm* — Nelson Mullins Riley & Scarborough LLP

(57) ABSTRACT

A process for producing absorbent materials includes reducing a banana tree stalk into separated fibers, pressing the separated fibers to generate pressed fibers having less than 50% moisture content by weight, reducing moisture content of the pressed fibers by applying infrared heating to produce pre-dried fibers, and applying a non-thermal drying process to generate dried fibers having less than 10% moisture content by weight for employment in an absorbent material that absorbs hydrocarbons.

9 Claims, 3 Drawing Sheets

PROCESS FOR CONVERTING BANANA TREE STALK INTO FIBERS FOR ABSORPTION OF HYDROCARBONS AND CORRESPONDING SYSTEM AND PRODUCT

CROSS-REFERENCE TO RELATED APPLICATION(S)

This application claims priority to and is a divisional of U.S. patent application Ser. No. 13/947,701, entitled "Process for Converting Banana Tree Stalk into Fibers for Absorption of Hydrocarbons and Corresponding System and Product", filed Jul. 22, 2013, which is hereby incorporated by reference in its entirety.

TECHNICAL FIELD

Example embodiments generally relate to the generation of useful fibers with specific absorptive properties, and more particularly relate to the use of banana tree fibers for absorption of hydrocarbons.

BACKGROUND

There are a number of tropical plants that produce fruit or other useful foodstuffs. These types of plants are popular for harvesting, and thus cultivation of such plants is common. However, with the exception of the fruit itself, the majority of the material associated with harvesting the fruit of these plants is generally considered to be waste material. Accordingly, the fibrous stalks of such plants are often disposed of in landfills or in other manners that are either not beneficial for the environment or, in some cases, may actually harm the environment. Although some of the discarded plant matter may be used as natural fertilizer, there may be still more uses for the fibrous stalks of some such plants.

Banana stalks are one example of a tropical plant that has a fibrous stalk that is often wasted. In this regard, the banana stalk dies after the fruit is produced and harvested, and it is common for the stalks, which are typically cut off to harvest the bananas, to be thrown away. These fibrous stalks of the banana tree and some other tropical plants can have as much as 93% to 96% of their weight comprised of water and natural latex content that may include a variety of resinous and gummy substances. Accordingly, in order to produce workable or useable fibers, the fibrous material must be cleaned and processed. In particular, much of the fluid within the stalks must be removed, and the latex or other natural resinous substances must also be extracted or washed out.

There have been a number of different processing methods developed for processing fibers. These processing methods take different amounts of energy, and have different advantages and disadvantages dependent upon the desired properties of the processed fiber that is expected to be achieved. Thus, it should be appreciated that it may be desirable to develop a processing technique that is optimized for generation of useful fibers with specific absorptive properties related to hydrocarbon absorption.

BRIEF SUMMARY OF SOME EXAMPLES

Accordingly, some example embodiments may enable the provision of an apparatus that employs banana tree fibers for absorption of hydrocarbons and a method of providing the same.

In one example embodiment, a process for producing absorbent materials, such as absorbent materials that absorb hydrocarbons, is provided. The process includes reducing a banana tree stalk into separated fibers, pressing the separated fibers to generate pressed fibers having less than 50% moisture content by weight, reducing moisture content of the pressed fibers by applying infrared heating to produce pre-dried fibers, and applying a non-thermal drying process to generate dried fibers having less than 10% moisture content by weight for employment in an absorbent material that absorbs hydrocarbons.

In another example embodiment, a system for producing absorbent materials, such as absorbent materials that absorb hydrocarbons, is provided. The system may include a reducer configured to reduce a banana tree stalk into separated fibers, a press configured to press the separated fibers to generate pressed fibers having less than 50% moisture content by weight, an infrared heating device configured to reduce moisture content of the pressed fibers by applying infrared heating to produce pre-dried fibers, and a non-thermal dryer configured to generate dried fibers having less than 10% moisture content by weight for employment in an absorbent material that absorbs hydrocarbons.

In another example embodiment, an absorbent material for absorption of hydrocarbons is provided. The absorbent material is prepared by operations including reducing a banana tree stalk into separated fibers, pressing the separated fibers to generate pressed fibers having less than 50% moisture content by weight, reducing moisture content of the pressed fibers by applying infrared heating to produce pre-dried fibers, and applying a non-thermal drying process to generate dried fibers having less than 10% moisture content by weight for employment in an absorbent material that absorbs hydrocarbons.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
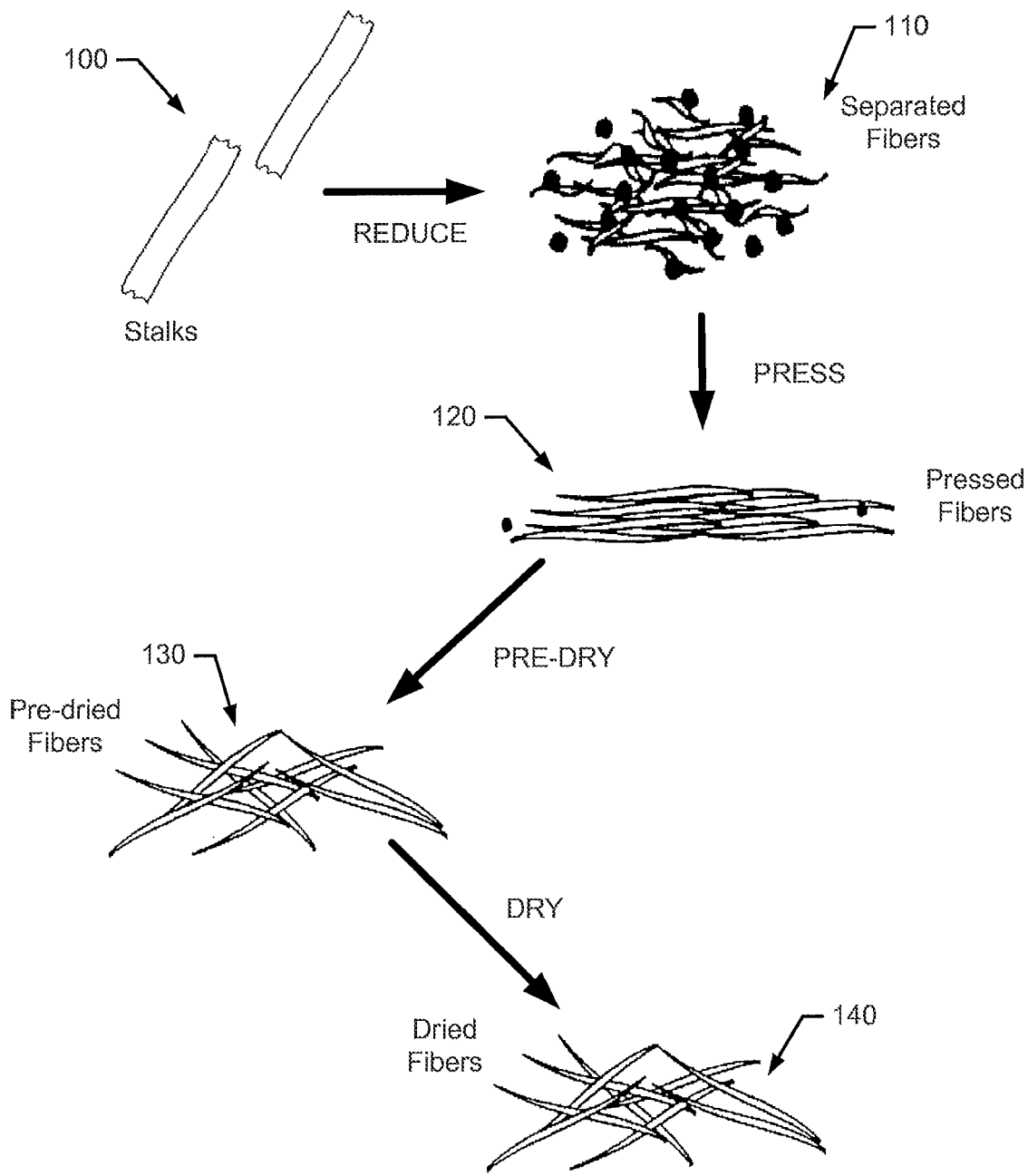
FIG. 1 illustrates a diagram of the states of materials associated with a process for producing absorbent materials according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

It should be appreciated that although an example embodiment is described below in the context of banana stalks, alternative embodiments may also be practiced in connection with other tropical plants. Thus, the specific example described herein should be regarded as non-limiting with regard to the specific materials used. As such, banana stalks or other tropical plant materials that are naturally hydrophobic, but may be processed as described herein to generate improved or optimal hydrocarbon absorption properties should be regarded as candidates for use in connection with the processes and materials described herein.

Some example embodiments may enable the provision of a process for converting the stalks of a banana tree that bears fruit into a plurality of fibers that are optimal for use in the absorption of hydrocarbons. In this regard, example embodiments provide a process for reduction of the banana tree stalk into separated fibers that can then be pressed to facilitate removal of naturally occurring resinous substances and/or latex. The pressing of the separated fibers may open the natural capillaries in the fibers to enhance absorptive characteristics, especially relative to absorption of hydrocarbons. Pre-drying and drying processes may then be employed to dry the fibers so they can be incorporated into materials or apparatuses that are suitable for absorption of hydrocarbons.

FIG. 1 illustrates a diagram of the states of materials associated with the process. In this regard, banana stalks 100 may be employed in connection with some embodiments. The banana stalks 100 may be obtained, for example, after fruit has been removed from the stalks, leaving the banana stalks 100 as a byproduct of the harvesting process. The banana stalks 100 may then be reduced into separated fibers 110. The separated fibers are then pressed to generate pressed fibers 120 that have a relatively high percentage of the excess natural resinous substances removed therefrom. In this regard, for example, water, latex and other natural juices within the fibers may be removed while forming the pressed fibers 120. The pressed fibers 120 may then be pre-dried to reduce the moisture levels of the fibers and produce pre-dried fibers 130. The pre-drying process may be accomplished with relatively low energy input. The pre-dried fibers 130 are then dried using non-thermal methods to produce dried fibers 140. By using non-thermal methods, again, the amount of energy consumption required to perform the processing required for example embodiments may be reduced. The dried fibers 140 may be used to make paper or other sorbent materials. In particular, the dried fibers 140 of some example embodiments may be employed within materials that are to be used for absorption of hydrocarbons such as petroleum products and the like.

Figure 2:
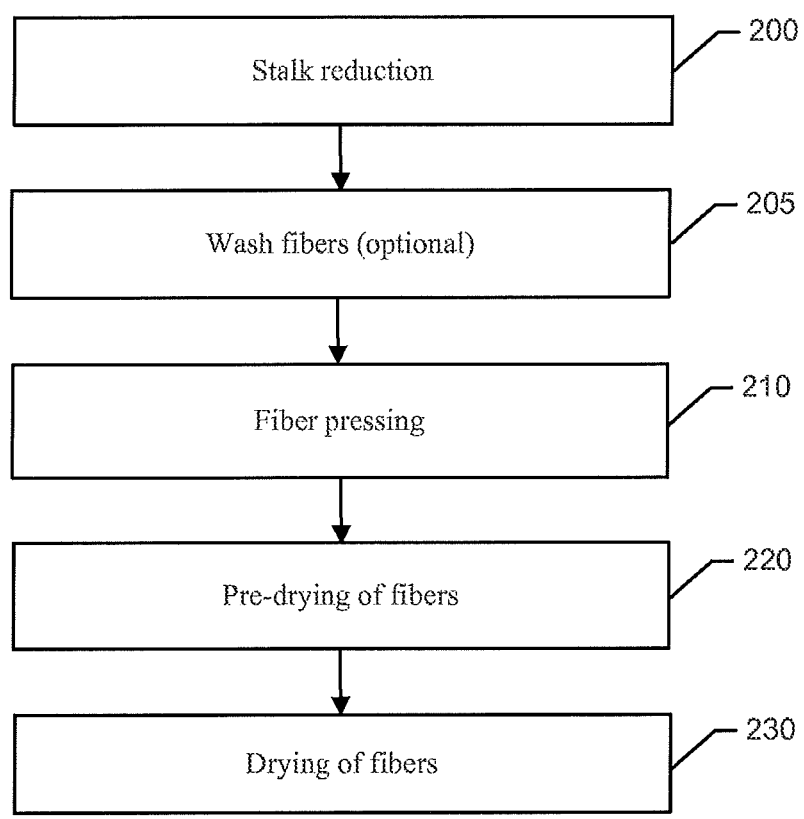
FIG. 2 illustrates a block diagram of a method for producing absorbent materials according to an example embodiment.
Figure 3:
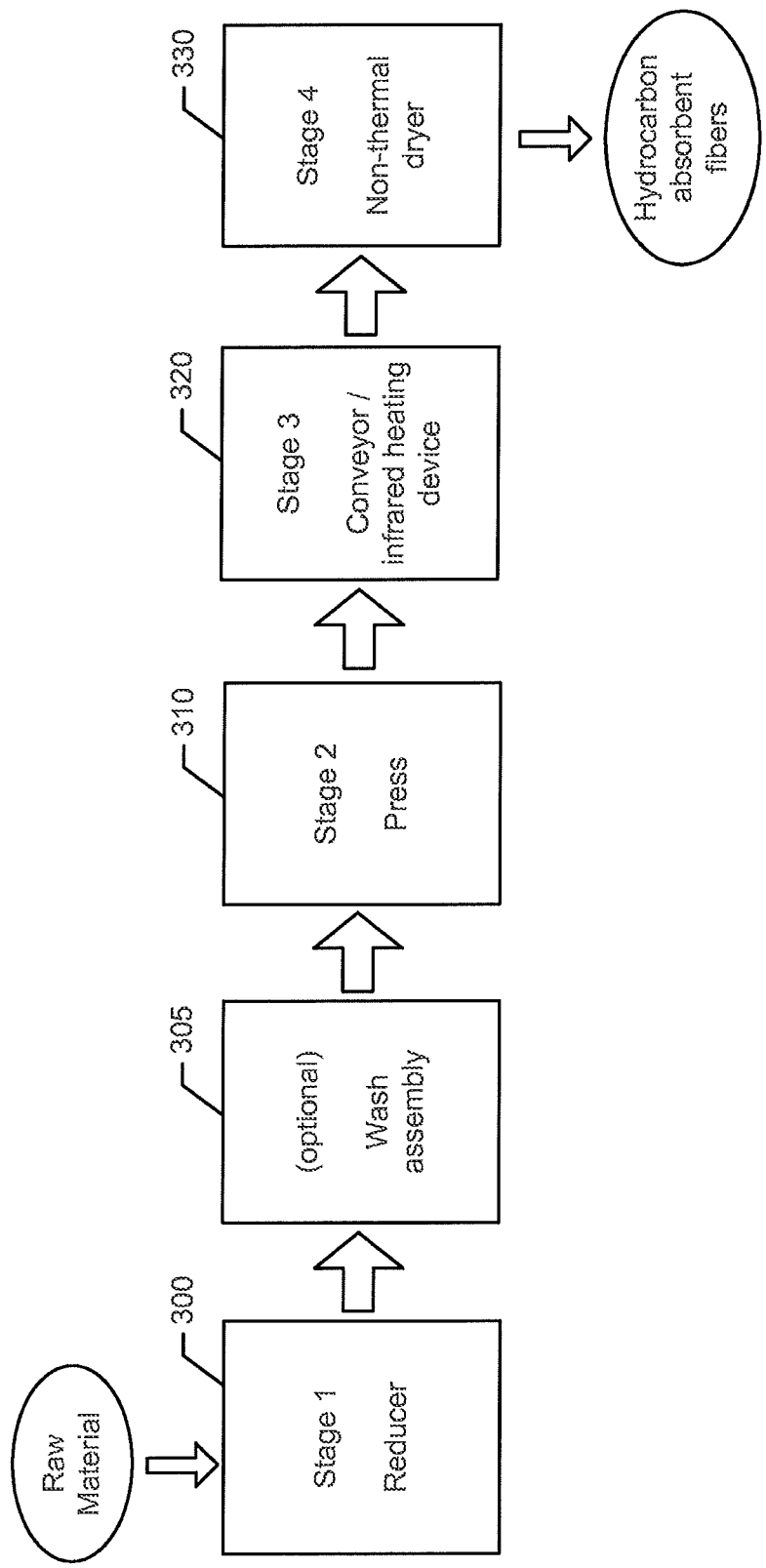
FIG. 3 illustrates a block diagram representing the equipment and corresponding processing stages associated with the method for producing absorbent materials in accordance with an example embodiment.

FIG. 2 illustrates a block diagram of a method of processing the material through the states shown in FIG. 1. FIG. 3 illustrates a block diagram showing the equipment involved in each stage or operation of the process of FIG. 2. An example embodiment will now be described in reference to FIGS. 1 to 3. In this regard, as shown in FIG. 2, the banana tree stalks 100 may be the raw material that is initially reduced (e.g., to form the separated fibers 110) at operation 200. Stalk reduction may include any or all of the operations of cutting the stalks and grinding, shredding or otherwise processing the stalks to separate the fibers therein. The separated fibers are naturally hydrophobic.

The stalk reduction of operation 200 may be performed as a first stage process in a reducer 300. The reducer 300 may include a bladed roller that draws the banana tree stalks 100 into a series of rotating knives or blades. The rotating knives or blades may then cut the stalks into pieces that may range in length from about ⅛ inch to about 1 inch while separating the fibers. The fibers may then be propelled through a grinder neck before being passed along to a press 310.

Although the separated fibers 110 could be washed at this stage as shown by operation 205 and wash assembly 305, an example embodiment may be practiced without washing the separated fibers 110 in order to reduce the cost, energy consumption and time of processing. Although not required, when the wash assembly 305 is employed, washing of fibers may be performed at operation 205 in order to facilitate removal of latex and/or fluids in the pressed fibers 120. The washing may be accomplished using water alone, or may further include the addition of a solution including potassium hydroxide, hydrogen peroxide, sodium hydroxide or the like. Thus, for example, the processing of operation 205 may a include treatment with solutions or fluids aimed at cleaning the fibers and/or enhancing certain characteristics of the fibers.

At operation 210, the separated fibers 110 may be pressed in the press 310 for second stage processing. The press 310 may be a hydraulically operated press, screw press, belt press, or any other suitable pressing device. In an example embodiment, pressing of the separated fibers 110 at operation 210 may remove a high percentage of excess natural resinous substances (e.g., latex), water, juice and/or other liquids from the separated fibers 110 to produce the pressed fibers 120, which may have a water and natural liquid content of about 43% to about 48% by weight. Thus, a reduction from greater than 90% moisture content by weight to about ½ that amount may be achieved via the press 310. The pressing operation may remove the naturally resinous substances (e.g., latex) in a manner that opens the natural capillaries in the fiber when the latex and other fluids are extracted. The open capillaries may be more receptive to hydrocarbon absorption and therefore may facilitate the ultimate production of materials that are highly absorbent of hydrocarbons.

In an example embodiment, the separated fibers 110 may be transferred to the press 310 from the reducer 300 by hand or by a conveyor device that extends between the reducer 300 and the press 310. Similarly, the pressed fibers 120 from the press 310 may be transported to the next stage (i.e., the pre-drying stage) by a conveyor device or by hand. In some cases, the conveyor device may incorporate agitation paddles or other means by which to further separate or aerate fibers and to facilitate drying both while the fibers are transported and when the fibers undergo further processing.

In some embodiments, the third stage processing may include pre-drying of fibers at operation 220. The pre-drying may be accomplished by passing the pressed fibers 120 through an infrared heating device 320. The infrared heating device 320 may include a conveyor that passes the pressed fibers 120 under a halogen lamp or other infrared generation means. The speed of the conveyor and the distance between the halogen lamp (or lamps) and the pressed fibers 120 in this stage may be configured to achieve the desired amount of moisture removal within a corresponding desired amount of time.

The infrared heating device 320 may be employed since electrically operated infrared heaters can radiate a relatively high percentage (e.g., greater than 80%) of their input energy as radiant energy for heating. Accordingly, the infrared heating device 320 may be a relatively low power and/or high-efficiency heating method to provide preliminary drying to the pre-dried fibers 130 before the pre-dried fibers 130 are passed along to the non-thermal dryer 330. Pre-drying using the infrared heating device 320 may therefore reduce moisture levels within the pre-dried fibers 130 before they are passed along to the non-thermal dryer 330. In an example embodiment, the moisture content after pressing may be in the neighborhood of 43% to 48%, and the infrared heating device 320 may be employed to reduce the moisture content another about 10% to 15%. Conveying devices or hand transport may also be used to provide the pre-dried fibers 130 to the non-thermal dryer 330.

Fourth stage processing at the non-thermal dryer 330 may include drying of the pre-dried fibers 130 at operation 230 to produce the dried fibers 140. In an example embodiment, the non-thermal dryer 330 may be configured to perform agitation or grinding of material while simultaneously drying the material using airflow. Thus, no heat input is required while grinding and drying are simultaneously accomplished in a one-step process. In some embodiments, the non-thermal dryer 330 may employ non-thermal, kinetic disintegration, pulverization that may be provided, for example, by a kinetic disintegration system (KDS). As such, in some embodiments, the non-thermal dryer 330 may be embodied as a non-thermal, kinetic disintegration, pulverization device.

In some cases, material may be fed into the non-thermal dryer 330 and encounter spinning chains or bars within a grinding or agitation chamber. In the agitation chamber, high velocity impacts are created as the chains or bars strike the material being processed (i.e., the pre-dried fibers 130) and high velocity airflows are also generated. Although no heat input is required or employed on the non-thermal dryer 330, that does not necessarily mean that heat generation or temperature elevation is not existent (or useful) in this process. Instead, it merely indicates that the additional energy cost associated with employing a heating element for this processing stage can be avoided. However, the kinetic energy associated with impact forces imparted on the fibers by rotating equipment, and the subsequent collisions of the fibers with chamber walls or other materials in the chamber may actually heat the fibers to facilitate drying. The high velocity impact forces may also further separate moisture from the fibers and, in some cases, decrease fiber size. Finally, the airflow that is generated may facilitate evaporation of surface moisture on the fibers and facilitate suspension of the fibers with the air stream to allow further drying of the particles.

In an example embodiment, a mesh may be employed to control release of processed fibers (i.e., dried fibers 140), which may be employed as hydrocarbon absorbent fibers. Thus, for example, the size of the mesh may dictate the size of the dried fibers 140. The non-thermal dryer 330 of an example embodiment may be operated to reduce the dried fibers 140 to less than 10% water content by weight. The dried fibers 140 may then be employed in absorbent apparatuses such as, for example, wipes, rags, towels, pillows, booms and/or the like. These absorbent apparatuses may be used for absorption of hydrocarbons or similar hazardous materials. Alternatively or additionally, the dried fibers 140 may be employed in other apparatuses or products such as, for example, loose absorbent materials that can be sprinkled or spread to absorb hydrocarbons or other hazardous materials.

Thus, according to an example embodiment, a process for producing absorbent materials, such as absorbent materials that absorb hydrocarbons, is provided. The process includes reducing a banana tree stalk into separated fibers, pressing the separated fibers to generate pressed fibers having less than 50% moisture content by weight, reducing moisture content of the pressed fibers by applying infrared heating to produce pre-dried fibers, and applying a non-thermal drying process to generate dried fibers having less than 10% moisture content by weight for employment in an absorbent material that absorbs hydrocarbons. A system configured to perform the process is also provided along with an absorbent material that is prepared using the process.

In an example embodiment, the operations of the process described above may be modified, augmented or supplemented with additional optional operations. Some examples of such modifications, augmentations or supplementations are described below. The modifications, augmentations or supplementations may be employed either alone or in any combination with each other. In an example embodiment, pressing the separated fibers may include pressing the separated fibers using a hydraulic press, a screw press or a belt press to remove water, latex, or natural juices. In some embodiments, pressing the separated fibers may include generating pressed fibers having opened capillaries for absorption of hydrocarbons and having less than 43% to 45% moisture content by weight. In some cases, reducing the banana tree stalk may include grinding, cutting or shredding the banana tree stalk to generate fibers of less than 1 inch in length. In an example embodiment, reducing moisture content of the pressed fibers may include passing the pressed fibers proximate to a halogen lamp via a conveyor device to achieve about 10% to 15% further reduction in moisture content. In some embodiments, a conveyor device may be employed to transport one or more of the separated fibers, the pressed fibers and the pre-dried fibers. In some cases, applying the non-thermal drying process may include employing non-thermal, kinetic disintegration, pulverization. In an example embodiment, applying a non-thermal drying process may include employing a drying process that employs kinetic energy and airflow, without a heat source, to dry the pre-dried fibers. In some examples, the process may further include providing the dried fibers for integration into one or more of a loose absorbent material, a wipe, a rag, a towel, a pillow or a boom.

Example embodiments may provide for the generation of absorbent materials that have exceptional characteristics relative to their properties for absorption of hydrocarbons. However, example embodiments may further generate such materials using a relatively inexpensive process that also consumes a relatively low amount of energy. In particular, the use of a non-thermal drying process for final drying of the fibers employed in connection with example embodiments may significantly reduce the overall processing and costs associated with preparing such absorbent materials.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A system for producing absorbent materials, the system comprising:
   a reducer configured to reduce a banana tree stalk into separated fibers;
   a press configured to press the separated fibers to generate pressed fibers having less than 50% moisture content by weight;
   an infrared heating device configured to reduce moisture content of the pressed fibers by applying infrared heating to produce pre-dried fibers;
   a non-thermal dryer configured to generate dried fibers having less than 10% moisture content by weight for employment in an absorbent material that absorbs hydrocarbons, wherein the non-thermal dryer is separate from the infrared heating device and is configured to generate dried fibers after the infrared heating device produces pre-dried fibers; and
   a mesh configured to process dried fibers as the dried fibers pass therethrough, wherein a size of the mesh dictates a corresponding size of the processed dried fibers allowed to pass through the mesh.

2. The system of claim 1, wherein the press comprises a hydraulic press, a screw press or a belt press configured to remove water, latex, or natural juices from the separated fibers.

3. The system of claim 1, wherein the press is configured to generate pressed fibers having opened capillaries for absorption of hydrocarbons.

4. The system of claim 1, further comprising a wash assembly for washing the fibers after the separated fibers are pressed.

5. The system of claim 1, wherein the infrared heating device comprises a halogen lamp and a conveyor device.

6. The system of claim 1, further comprising a conveyor device disposed between one or more of the reducer, the press, the infrared heating device and the non-thermal dryer.

7. The system of claim 1, wherein the non-thermal dryer comprises a non-thermal, kinetic disintegration, pulverization device.

8. The system of claim 1, wherein the non-thermal dryer is configured to generate the dried fibers using kinetic energy and airflow, without a heat source.

9. The system of claim 1, wherein the processed dried fibers are integrated into one or more of a loose absorbent material, a wipe, a rag, a towel, a pillow or a boom.

* * * * *